(12) United States Patent  (10) Patent No.: US 8,301,015 B2
Tanaka et al.  (45) Date of Patent: Oct. 30, 2012

(54) RECORDING CONTROL APPARATUS, RECORDING CONTROL METHOD, AND PROGRAM

(75) Inventors: Hisao Tanaka, Tokyo (JP); Takashi Furukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1243 days.

(21) Appl. No.: 11/736,328

(22) Filed: Apr. 17, 2007

(65) Prior Publication Data

US 2007/0248325 A1  Oct. 25, 2007

(30) Foreign Application Priority Data

Apr. 21, 2006  (JP) ................................ P2006-117972

(51) Int. Cl.
    *H04N 5/93* (2006.01)
(52) U.S. Cl. ....................................... 386/278
(58) Field of Classification Search ......................... None
    See application file for complete search history.

(56) References Cited

U.S. PATENT DOCUMENTS

| 5,339,393 | A | | 8/1994 | Duffy et al. |
| 5,467,288 | A | * | 11/1995 | Fasciano et al. ............... 715/716 |
| 5,760,767 | A | | 6/1998 | Shore et al. |
| 5,974,220 | A | * | 10/1999 | Kajimoto ....................... 386/278 |
| 6,546,188 | B1 | | 4/2003 | Ishii et al. |
| 6,670,966 | B1 | | 12/2003 | Kusanagi |
| 6,763,177 | B1 | * | 7/2004 | Abe et al. ....................... 386/281 |
| 6,782,188 | B1 | | 8/2004 | Ido et al. |
| 6,965,723 | B1 | | 11/2005 | Abe et al. |
| 2005/0117878 | A1 | * | 6/2005 | Murata et al. ................... 386/52 |

FOREIGN PATENT DOCUMENTS

| EP | 0 884 900 A1 | 12/1998 |
| EP | 1 102 274 A2 | 5/2001 |
| EP | 1 143 449 A1 | 10/2001 |
| GB | 2 356 734 A | 5/2001 |
| JP | 8-297956 | 11/1996 |
| JP | 11-120746 | 4/1999 |
| JP | 2000-182360 | 6/2000 |
| JP | 2000-285653 | 10/2000 |
| JP | 2006-107640 | 4/2006 |
| JP | 2006-107646 | 4/2006 |
| WO | WO 93/21588 | 10/1993 |

* cited by examiner

*Primary Examiner* — Huy T Nguyen
(74) *Attorney, Agent, or Firm* — Oblon, Spivak, McClelland, Maier & Neustadt, L.L.P.

(57) ABSTRACT

A recording control apparatus for recording new data on a recording medium on which data forming an edit result is recorded for each file. The recording control apparatus includes: a specification section specifying an insert section into which the new data is inserted in the edit result; and when a part of or all of a plurality of the files are included in the insert section, a recording control section recording data out of the new data, as first additional data, corresponding to a section other than a section from a start position of the insert section to the end of a start file being a file including data of the start position into an unrecorded area in which the files are not recorded and recording data other than the first additional data, out of the new data, into a predetermined area of the recording medium.

10 Claims, 17 Drawing Sheets

CLIP#1: TC = 00m01s TO 00m11s

CLIP#2: TC = 00m01s TO 00m09s

CLIP#3: TC = 00m03s TO 00m15s

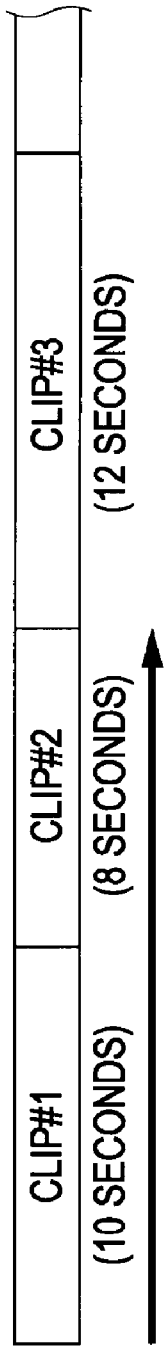
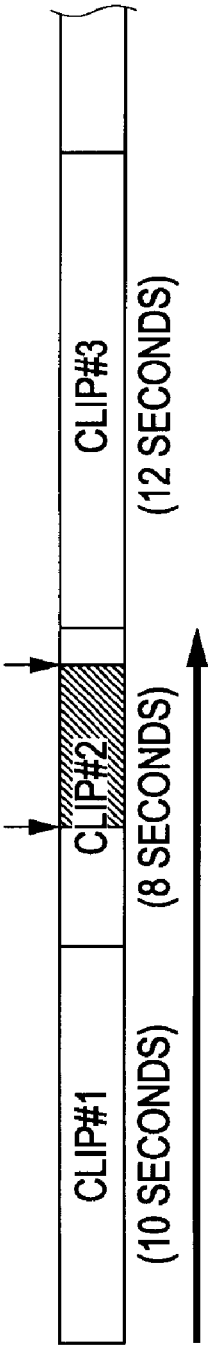
FIG. 7A
FIG. 7B

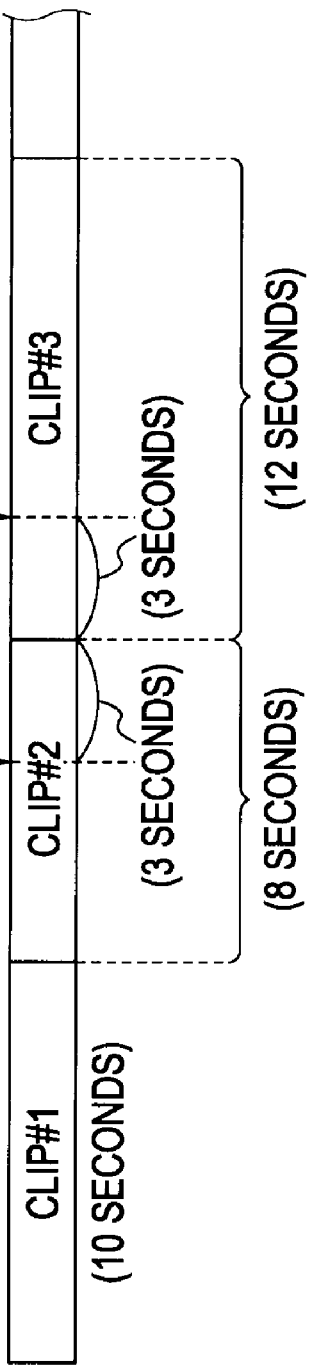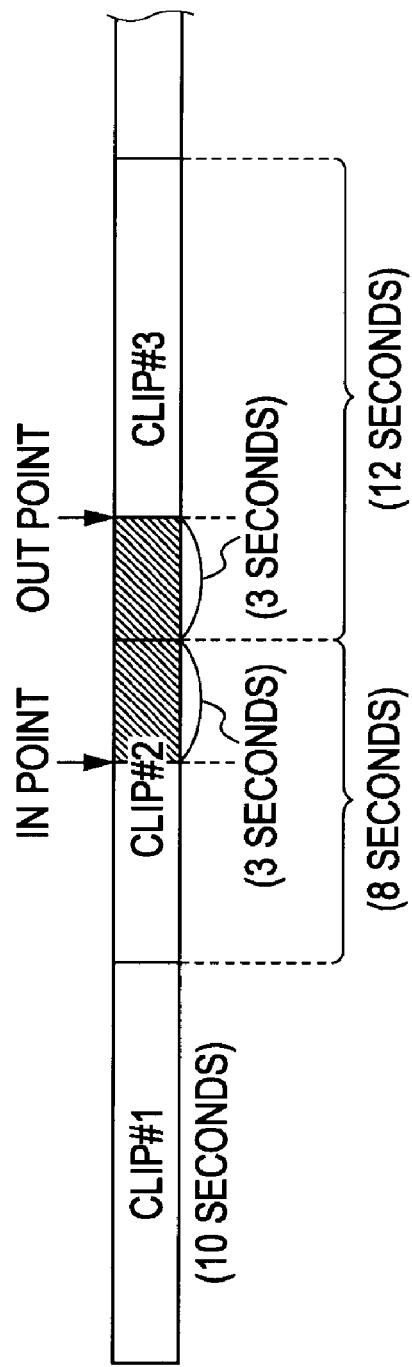

CLIP#1: TC = 00m01s TO 00m11s
CLIP#2: TC = 00m01s TO 00m06s
CLIP#4: TC = 00m00s TO 00m06s
CLIP#3: TC = 00m03s TO 00m15s

RECORDING CONTROL APPARATUS, RECORDING CONTROL METHOD, AND PROGRAM

CROSS REFERENCES TO RELATED APPLICATIONS

The present invention contains subject matter related to Japanese Patent Application JP 2006-117972 filed in the Japanese Patent Office on Apr. 21, 2006, the entire contents of which are incorporated herein by reference.

BACKGROUND OF THE INVENTION

1. Field of the Invention

The present invention relates to a recording control apparatus, a recording control method, and program. More particularly, the present invention relates to a recording control apparatus, a recording control method, and program capable of reproducing an edit result such that when a part of or all of a plurality of files are included in an insert section, the beginning file included in the insert section is overwritten by new data, and the files other than the beginning file are protected without change.

2. Description of the Related Art

To date, linear editing, such as assemble editing, insert editing, etc., has been performed for VTRs (Video Tape Recorders).

Here, a description will be given of linear editing with reference to FIGS. 1A to 1E.

In this regard, in FIGS. 1A to 1E, clips obtained as a result of shooting are recorded on a tape. Here, a clip means, for example, a collection of image data obtained by one shot of shooting (a shot from the start of shooting to the end of shooting), the audio data corresponding to the image data, etc. Also, Clip#i represents the clip obtained by the i-th shot.

As shown in FIG. 1A, if Clip#1 whose reproducing time period is 10 seconds is recorded, when a user assemble edits Clip#2 whose reproducing time period is 10 seconds, for example, the user specifies the end position indicating the time code (in the following, referred to as an edit-result time code) for the edit result of the end of Clip#1 as In Point of the edit section, and specifies the edit-result time code of after 10 seconds as Out Point, which is a reproducing time of Clip#2 from In Point. In this case, as shown in FIG. 1B, Clip#2 is sequentially recorded from the beginning to the end following the end of Clip#1.

Also, when the user performs assemble editing, the user can specify the edit-result time code in the middle of the last clip among the recorded clips for the beginning position indicating the beginning edit-result time code as In Point.

For example, as shown in FIG. 1B, if Clip#1 and Clip#2 are recorded, when the user assemble edits Clip#3 whose reproducing time period is 12 seconds, the user specifies an edit-result time code of 8 seconds after the start position of Clip#2 as In Point of the edit section, and specifies, as Out Point, the edit-result time code of after 12 seconds, which is a reproducing time period of Clip#3 from In Point. Thus, as shown in FIG. 1C, the section from 8 seconds after the start position of Clip#2 to the end position is overwritten by Clip#3.

That is to say, the reproducing time period of Clip#2 becomes 8 seconds. Accordingly, if the tape is reproduced continuously, the clips are reproduced in the sequence of recording on the tape, namely, in the order of Clip#1, Clip#2, and Clip#3. Thus, Clip#3 is reproduced after 18 seconds from the start of the reproducing of Clip#1.

On the other hand, as shown in FIG. 1C, if Clip#1 to Clip#3 are recorded, when the user performs insert editing, using the insert section to which new data is inserted as the edit section, the user specifies the edit-result time code of the start position of the edit section as In Point, and specifies the edit-result time code of the end position as Out Point. In this case, the edit section is overwritten by the clip to be inserted.

For example, if the edit section is a part of the section from the start position of Clip#2 to the end position of Clip#2, as shown in FIG. 1D, the edit section is overwritten. Also, if In Point of the edit section is located in the section from the start position to the end position of Clip#2, and Out Point is located in the section from the start position to the end position of Clip#3, that is to say, the edit section extends over two clips, the edit section is overwritten as shown in FIG. 1E. That is to say, the section from In Point to the end of Clip#2 and the section from the beginning of Clip#3 to Out Point are overwritten.

As described above, when insert edit is performed, the edit section is overwritten, and thus the edit-result time codes of the start position and the end position of each clip are not changed before and after the edit. For example, as shown in FIGS. 1D and 1E, even if insert edit is performed, Clip#3 is reproduced 18 seconds after the start of the reproducing of Clip#1.

Also, in recent years, apparatuses for performing nonlinear editing on the clips recorded as files on the recording medium such as a disc, have become widespread. In such an apparatus for performing nonlinear editing, an edit list indicating the reproducing sequence of the data forming an edit result is generated, and the edit result is reproduced by referring to the edit list.

FIG. 2 illustrates an example of an edit list.

In the edit list in FIG. 2, information (in the example in FIG. 2, "Clip#i") for identifying a clip is described in the reproducing sequence from above, and a time code (in the following, referred to as a clip time code) for each clip, which indicates the start position and the end position of each clip included in the edit result, is described in accordance with the information.

By the edit list in FIG. 2, the section of Clip#1 having a clip time code of 1 second to 11 seconds, the section of Clip#2 having a clip time code of 1 second to 9 seconds, and the section of Clip#3 having a clip time code of 3 seconds to 15 seconds are reproduced in sequence as the edit result.

That is to say, as shown in FIG. 3, Edit Clip#1, which is the data of Clip#1 included in the edit result, is the section having a clip time code from 1 second to 11 seconds out of Clip#1 having a reproducing time period of 14 seconds, and has a reproducing time period of 10 seconds. Also, Edit Clip#2, which is the data of Clip#2 included in the edit result, is the section having a clip time code from 1 second to 9 seconds out of Clip#2 having a reproducing time period of 12 seconds, and has a reproducing time period of 8 seconds. Furthermore, Edit Clip#3, which is the data of Clip#3 included in the edit result, is the section having a clip time code from 3 seconds to 15 seconds out of Clip#3 having a reproducing time period of 16 seconds, and has a reproducing time period of 12 seconds.

By referring to the edit list in FIG. 2, as shown in FIG. 4A, the clips are reproduced, as the edit result, in the order of Edit Clip#1, Edit Clip#2, and Edit Clip#3. That is to say, Edit Clip#3 is started to be reproduced after 18 seconds from the start of the reproducing of Edit Clip#1.

Here, when the user extends Edit Clip#2 for two seconds in the edit result, the user changes the clip time code corresponding to Clip#2 in the edit list in FIG. 2. For example, the user changes the clip time code indicating the end position corresponding to Clip#2 from 9 seconds to 11 seconds. As a result, Edit Clip#2 becomes the section having a clip time code from 1 second to 11 seconds, and the reproducing time period becomes 10 seconds.

Accordingly, as shown in FIG. 4B, the clips are reproduced, as the edit result, in the order of Edit Clip#1 having a reproducing time period of 10 seconds, Edit Clip#2 having a reproducing time period of 10 seconds, and Edit Clip#3 having a reproducing time period of 12 seconds. That is to say, Edit Clip#3 is started to be reproduced after 20 seconds from the start of the reproducing of Edit Clip#1.

As described above, nonlinear editing is performed by adding, changing, or deleting the description contents of the edit list. Also, if the user extends the edit clip to be used for an edit result, the edit clip to be reproduced after the edit clip has a delay in the reproducing start time, but has no change in the reproducing time period.

As described above, linear editing and nonlinear editing have individually different characteristics, and the editing methods for the user are individually different. Accordingly, the user who is accustomed to one of the editing methods is often not accustomed to the other of the editing methods.

Thus, a hybrid editing apparatus having mixed functions of linear editing and nonlinear editing has been devised. In such a hybrid editing apparatus, in the same manner as at the time of nonlinear editing, an index file indicating the reproducing sequence of the data forming the edit result is generated, and the edit result is reproduced by referring to the index file.

FIG. 5 illustrates an example of the index file.

In the index list in FIG. 5, information (in the example in FIG. 5, "Clip#i") for identifying a clip is described in the reproducing sequence from above, and a reproducing time period for each clip is described in accordance with the information. By the index list in FIG. 5, as shown in FIG. 6, Clip#1 having a reproducing time period of 10 seconds, Clip#2 having a reproducing time period of 8 seconds, and Clip#3 having a reproducing time period of 12 seconds are reproduced in sequence as the edit result as shown in FIG. 7A. Accordingly, Clip#3 is started to be reproduced after 18 seconds from the start of the reproducing of Clip#1.

Here, when the user inserts a new clip into the section from the beginning position of one clip to the end position, it is possible for the user to perform insert editing in the same manner as a VTR by specifying In Point and Out Point of the insert section as an edit section. For example, when the user performs insert editing by specifying predetermined positions as In Point and Out Point between the beginning position and the end position of Clip#2, as shown in FIG. 7B, the data of the section from In Point of Clip#2 to Out Point is overwritten by the new clip. In this regard, by a hybrid editing apparatus, it is possible to perform assemble editing in the same manner as a VTR.

SUMMARY OF THE INVENTION

As described above, when the user performs insert editing, all the data in the edit section is overwritten with a clip to be inserted. Also, when the user performs nonlinear editing using an edit list, it is easy to add a new edit clip in the edit result. However, in order to reproduce the data so as to have been overwritten by the new edit clip, it is necessary to change the edit list in a complicated way, and thus it is difficult to do so.

Accordingly, when a part of or all of a plurality of clips are included in an insert section specified as an edit section, it has been difficult to satisfy the user's requirements for reproducing the edit result such that the beginning clip included in the insert section is overwritten by the clip to be inserted, and the files other than the beginning clip are protected without change.

The present invention has been made in view of these circumstances. It is desirable to allow the user to reproduce an edit result such that when a part of or all of a plurality of files are included in an insert section, the beginning file included in the insert section is overwritten by new data, and the files other than the beginning file are protected without change.

According to an embodiment of the present invention, there is provided a recording control apparatus for recording new data on a recording medium on which data forming an edit result is recorded for each file, the recording control apparatus including: a specification section specifying an insert section being a section into which the new data is inserted in the edit result; and when a part of or all of a plurality of the files are included in the insert section, a recording control section recording data out of the new data, as first additional data, corresponding to a section other than a section from a start position of the insert section to the end of a start file being a file including data of the start position into an unrecorded area being an area in which the files are not recorded and recording data other than the first additional data, out of the new data, into a predetermined area of the recording medium.

Also, the recording control apparatus according to the embodiment of the present invention may further include a generation section generating sequence information indicating a reproducing sequence included in the data forming the edit result, wherein the generation section may generate the sequence information such data of a section from the beginning of the start file to the start position and the new data are reproduced in sequence, and then a next file having the reproducing sequence next to the start file before insertion is reproduced from the beginning.

When a part of or all of a plurality of files are included in the insert section, the recording control section may record data other than the first additional data out of the new data into a recording area having a recorded section from the start position of the insert section to the end of the start file.

Also, the recording control apparatus according to the embodiment of the present invention may further include a setting section setting an insert mode in which the new data is inserted into the edit result to an additional-insert mode in which the first additional data is recorded into the unrecorded area, wherein when the insert mode is the additional-insert mode, if a part of or all of a plurality of the files are included in the insert section, the recording control section may record the first additional data into the unrecorded area and records data other than the first additional data, out of the new data, into a predetermined area of the recording medium, when the insert mode is not the additional-insert mode, the recording control section may overwrite the new data into a recording area in which data corresponding to the insert section is recorded, when the insert mode is the additional-insert mode, the generation section may generate the sequence information such that data of a section from the beginning of the start file to the start position and the new data are reproduced in sequence and then the next file is reproduced from the beginning, and when the insert mode is not the additional-insert mode, the generation section may generate the sequence information such that data of a section from the beginning of the start file to the start position and the new data are reproduced in sequence and then the next file is reproduced from data corresponding to the end position of the insert section.

According to another embodiment of the present invention, there is provided a method of controlling recording of a recording control apparatus for recording new data on a recording medium on which data forming an edit result is recorded for each file, the method including the steps of: specifying an insert section being a section into which the new data is inserted in the edit result; when a part of or all of a plurality of the files are included in the insert section, recording data out of the new data, as first additional data, corresponding to a section other than a section from a start position of the insert section to the end of a start file being a file including data of the start position into an unrecorded area being an area in which the files are not recorded and recording data other than the first additional data, out of the new data, into a predetermined area of the recording medium; and generating sequence information indicating reproducing sequence included in the data forming the edit result such that data of a section from the beginning of the start file to the start position and the new data are reproduced in sequence and then the next file having a reproducing sequence next to the start file before insertion is reproduced from the beginning.

According to another embodiment of the present invention, there is provided A program for causing a computer to perform processing for recording new data on a recording medium on which data forming an edit result is recorded for each file, the program including the steps of: specifying an insert section being a section into which the new data is inserted in the edit result; when a part of or all of a plurality of the files are included in the insert section, recording data out of the new data, as first additional data, corresponding to a section other than a section from a start position of the insert section to the end of a start file being a file including data of the start position into an unrecorded area being an area in which the files are not recorded and recording data other than the first additional data, out of the new data, into a predetermined area of the recording medium; and generating sequence information indicating reproducing sequence included in the data forming the edit result such that data of a section from the beginning of the start file to the start position and the new data are reproduced in sequence and then the next file having a reproducing sequence next to the start file before insertion is reproduced from the beginning.

By the present invention, when an insert section into which new data is inserted is specified in the edit result, and a part of or all of a plurality of the files are included in the insert section, the data out of the new data, as first additional data, corresponding to a section other than a section from a start position of the insert section to the end of a start file including data of the start position is recorded into an unrecorded area in which the files are not recorded and data other than the first additional data, out of the new data, is recorded into a predetermined area of the recording medium. Also, the sequence information indicating the reproducing sequence included in the data forming the edit result is generated such that data of the section from the beginning of the start file to the start position and the new data are reproduced in sequence and then a next file whose reproducing sequence before insertion is next to the start file is reproduced from the beginning.

As described above, by the present invention, it is possible to reproduce an edit result such that when a part of or all of a plurality of files are included in an insert section, the beginning file included in the insert section is overwritten by new data, and the files other than the beginning file are protected without change.

BRIEF DESCRIPTION OF THE DRAWINGS

FIG. 7 is a diagram illustrating an example of an edit result of hybrid editing;
FIG. 12 is a diagram illustrating an example of the structure of an edit result before insert processing;
FIG. 13 is a diagram illustrating an edit result after insert processing is performed in a VTR-like mode.

DESCRIPTION OF THE PREFERRED EMBODIMENTS

In the following, a detailed description will be given of a specific embodiment of the present invention with reference to the drawings.

Figure 8:
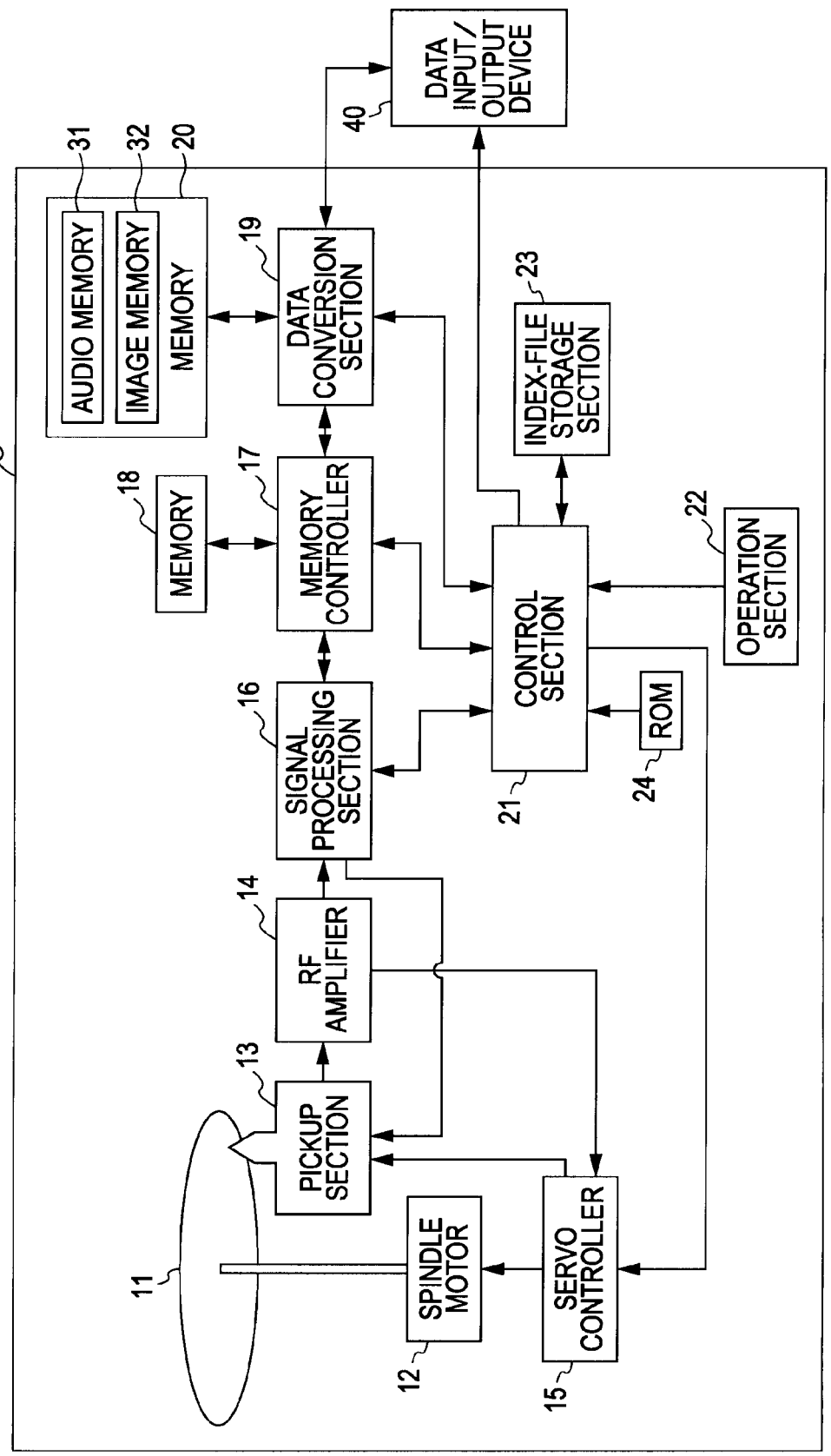
FIG. 8 is a block diagram illustrating an example of the configuration of a disc editing apparatus according to an embodiment of the present invention.

FIG. 8 illustrates an example of the configuration of a disc editing apparatus according to an embodiment of the present invention. In this regard, the disc editing apparatus 10 of FIG. 8 is a hybrid editing apparatus mixedly including functions of linear editing and nonlinear editing.

A spindle motor 12 drives an optical disc 11 to rotate at a CLV (Constant Linear Velocity) or a CAV (Constant Angular Velocity) on the basis of a spindle-motor drive signal from a servo controller 15.

An optical pickup section 13 controls the output of laser light on the basis of a recording signal supplied from a signal processing section 16 to record the recording signal onto the optical disc 11. Also, the pickup section 13 condenses and emits laser light onto the optical disc 11, performs photoelectric conversion on the reflected light from the optical disc 11 to generate an electronic signal, and supplies the signal to an RF (Radio Frequency) amplifier 14. In this regard, the laser-light emitted position is controlled to a predetermined position by a servo signal supplied from the servo controller 15 to the pickup section 13.

The RF amplifier 14 generates a focus error signal, a tracking error signal, and a reproducing signal on the basis of the electronic signal from the pickup section 13, supplies the tracking error signal and the focus error signal to the servo controller 15, and supplies the reproducing signal to the signal processing section 16.

The servo controller 15 controls the focus servo operation and the tracking servo operation. Specifically, the servo controller 15 generates a focus servo signal and a tracking servo signal on the basis of the focus error signal and the tracking error signal, respectively, from the RF amplifier 14, and supplies them to an actuator (not shown in the figure) of the pickup section 13. Also, the servo controller 15 generates the spindle-motor drive signal for driving the spindle motor 12, and controls the spindle servo operation to rotate the optical disc 11 at a predetermined rotational speed.

Furthermore, the servo controller 15 performs thread control for moving the pickup section 13 in the radial direction of the optical disc 11 to change the laser-light emitted position. In this regard, the setting of the signal-read position of the optical disc 11 is performed by a control section 21. The position of the pickup section 13 is controlled so as to allow reading the signal from the set read position.

The signal processing section 16 modulates the recording data input from a memory controller 17 to generate the recording signal, and supplies the signal to the pickup section 13. Also, the signal processing section 16 demodulates the reproducing signal from the RF amplifier 14 to generate the reproducing data, and supplies the data to the memory controller 17.

The memory controller 17 stores the recording data from a data conversion section 19 or the reproducing data from the signal processing section 16 into a memory 18. Also, the memory controller 17 reads the data, and supplies the data to the signal processing section 16 or the data conversion section 19.

Among the clips, such as the image data and audio data captured by the video camera (not shown in the figure) and supplied from a data input/output device 40, the data conversion section 19 stores the audio data into an audio memory 31 of a memory 20 and stores the image data into an image memory 32 of the memory 20. The data conversion section 19 reads out the audio data or the image data from the memory 20, compresses the data on the basis of the formats, such as MPEG (Moving Picture Experts Group), JPEG (Joint Photographic Experts Group), etc., as necessary, and supplies the data to the memory controller 17 as recording data.

Also, the data conversion section 19 expands the reproducing data supplied from the memory controller 17 as necessary, converts into the output signal of a predetermined format, and supplies the signal to the data input/output device 40. Also, the data conversion section 19 expands the reproducing data as necessary, stores the audio data out of the reproducing data obtained as a result into the audio memory 31, and stores the image data into the image memory 32.

The control section 21 controls the servo control section 15, the signal processing section 16, the memory controller 17, and the data conversion section 19 on the basis of the operation signal from the operation section 22, the index file indicating the reproducing sequence of the data forming the edit result, which has been read from an index-file storage section 23, etc., in accordance with the program stored in a ROM 24, and executes the recording/reproducing processing.

Specifically, the control section 21 reproduces, for example the edit result formed by the clips recorded on the optical disc 11 in real time by referring to the index file, and supplies it to the data input/output device 40. In this case, for example the user specifies In Point and Output Point in an edit section by operating the operation section 22 while viewing the image corresponding to the edit result displayed by the data input/output device 40. Also, the user specifies clips to be included in an edit result. The control section 21 requests the clips to be included in the edit result specified by the user from the data input/output device 40, and records the clips supplied from the data input/output device 40 in accordance with the request on the basis of the edit section specified by the user.

In this regard, the user can also directly input an edit-result time code as In Point or Out Point by operating the operation section 22.

Also, the control section 21 generates an index file on the basis of the operation signal from the operation section 22 in accordance with the program stored in the ROM 24, and supplies and stores the file into the index-file storage section 23. The operation section 22 is, for example operated by the user, and supplies the operation signal corresponding to the operation to the control section 21.

In the disc editing apparatus 10 having the configuration described above, when the user specifies an edit section by operating the operation section 22, the clip supplied from the data input/output device 40 is supplied and recorded onto the optical disc 11 through the data conversion section 19, the memory controller 17, the signal processing section 16, and the pickup section 13.

Also, when the user instructs to reproduce a clip by operating the operation section 22, the clip is reproduced from the optical disc 11 through the pickup section 13, the RF amplifier 14, the signal processing section 16, the memory controller 17, and the data conversion section 19, and is supplied to the data input/output device 40.

Figure 9:
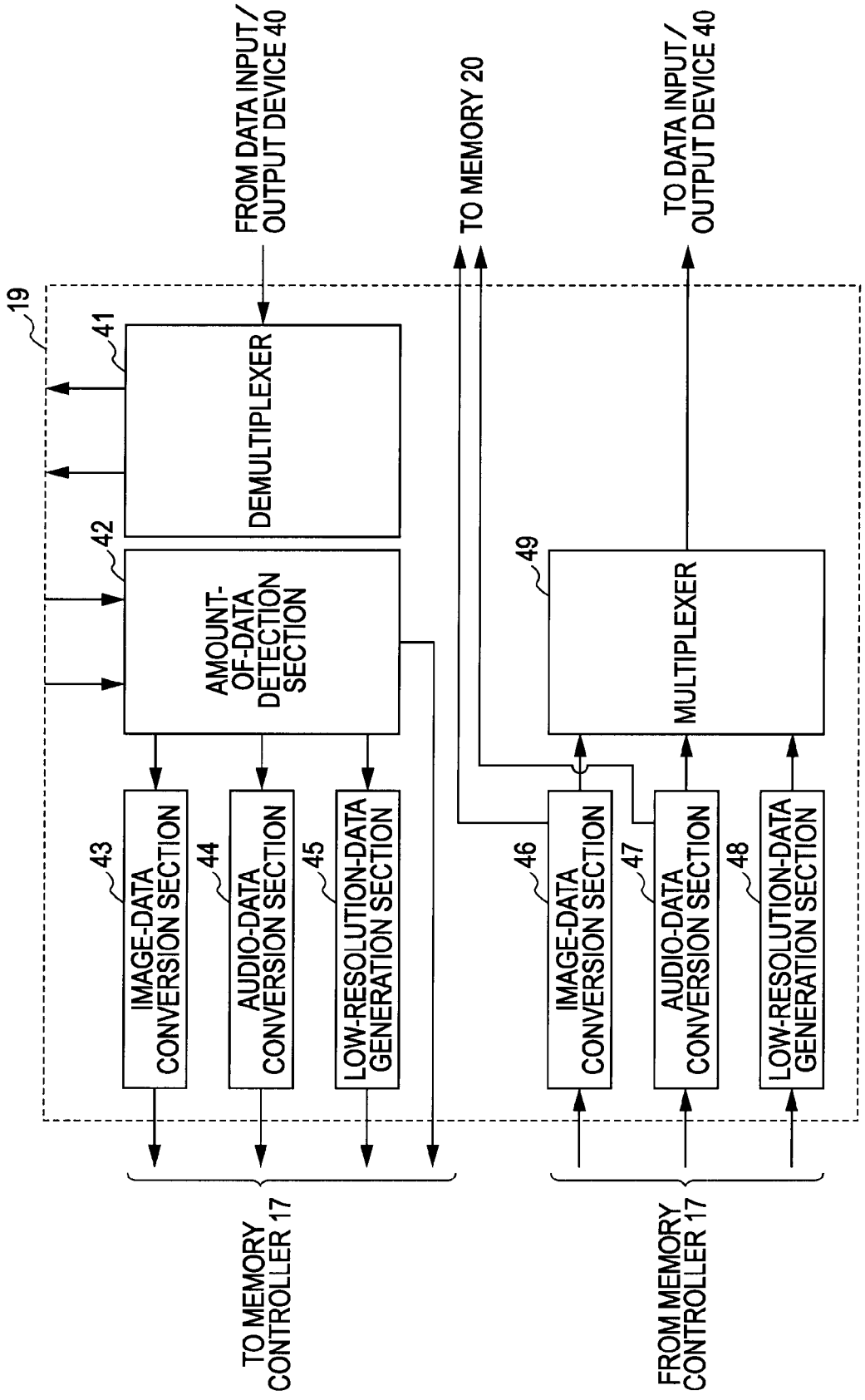
FIG. 9 is a block diagram illustrating an example of the configuration of a data conversion section.

Next, FIG. 9 illustrates an example of the configuration of the data conversion section 19 in FIG. 8.

When a clip is recorded onto the optical disc 11, the clip to be recorded is supplied from the data input/output device 40 to a demultiplexer 41. The demultiplexer 41 separates the clip supplied from the data input/output device 40 into a plurality of related data sequences, that is to say, for example, moving picture (for example, baseband) image data and (for example, baseband) audio data attached to the image data, supplies the image data to the image memory 32, and supplies the audio data to the audio memory 31.

An amount-of-data detection section 42 supplies the image data read from the image memory 32 of the memory 20 and the audio data read from the audio memory 31 to an image-data conversion section 43 and an audio-data conversion section 44, respectively, without change. At the same time, the amount-of-data detection section 42 detects the amount of the image data and the amount of the audio data, and supplies them to the memory controller 17. That is to say, the amount-of-data detection section 42 detects, for example, the amount of data for a predetermined reproducing time individually on the image data and the audio data supplied from the memory 20, and supplies the amounts to the memory controller 17.

Also, the amount-of-data detection section 42 supplies the image data read from the image memory 32, and further the audio data read from the audio memory 31 as necessary to a low-resolution data generation section 45.

The image-data conversion section 43 performs MPEG encoding on the image data supplied from the amount-of-data detection section 42, for example, MPEG encodes all the frames into I (Intra) pictures, and supplies the data sequence of the image data obtained as a result to the memory controller 17 as recording data. Also, the audio-data conversion section 44, for example, performs MPEG encoding on the audio data supplied from the amount-of-data detection section 42, and supplies the data sequence of the audio data obtained as a result to the memory controller 17 as recording data.

The low-resolution generation section 45 generates the data sequence of the low-resolution data which is the data having a reduced amount of data supplied thereto, and supplies the data sequence to the memory controller 17 as recording data.

That is to say, the low-resolution generation section 45 generates reduced image data, which is image data having frames with a few number of pixels by thinning the number of pixels of each frame of the image data supplied through the amount-of-data detection section 42. Furthermore, the low-resolution generation section 45 encodes the reduced image data, for example by MPEG4, and outputs the encoded result as low-resolution data.

In this regard, the low-resolution generation section 45 can include the audio data supplied through the amount-of-data detection section 42 or the audio data with reduced amount of data by thinning the samples of the audio data, etc., in the low-resolution data (for example, multiplexed to reduced image data for each frame) to output the data. In the following, it is assumed that the low-resolution data include audio data.

As described above, the low-resolution data is the image and audio having the same contents as the image data output by the image-data conversion section 43 and the audio data output by the audio-data conversion section 44, but the amount of data is small. Accordingly, when reproducing is performed for a certain reproducing time period, the low-resolution data can be reproduced from the optical disc 11 in a short period of time compared with the image data output by the image-data conversion section 43 and the audio data output by the audio-data conversion section 44.

As described above, the recording data supplied to the memory controller 17 is recorded onto the optical disc 11.

On the other hand, as described above, at the time of reproducing a clip from the optical disc 11, data is reproduced from the optical disc 11. Among the reproduced data, the data sequence of the image data is supplied from the memory controller 17 to an image-data conversion section 46, and the data sequence of the audio data is supplied from the memory controller 17 to an audio-data conversion section 47. Also, among the reproduced data, the data sequence of the low-resolution data is supplied from the memory controller 17 to the low-resolution data processing section 48.

The image-data conversion section 46, for example MPEG decodes the data sequence of the image data supplied from the memory controller 17, and supplies the image data obtained as a result to the image memory 32 of the memory 20 to be stored, or supplies the data to a multiplexer 49. Also, the audio-data conversion section 47, for example MPEG decodes the data sequence of the audio data supplied from the memory controller 17, and supplies the audio data obtained as a result to the audio memory 31 of the memory 20 to be stored, or supplies the data to the multiplexer 49.

The low-resolution data processing section 48 decodes the data sequence of the low-resolution data supplied from the memory controller 17 to the image data and the audio data, which have small amount of data, and supplies the data to the multiplexer 49.

The multiplexer 49 supplies the image data supplied from the image-data conversion section 46, the audio data supplied from the audio-data conversion section 47, and the low-resolution data supplied from the low-resolution data processing section 48 to the data input/output device 40. In this regard, the multiplexer 49 may multiplex and output the image-data conversion section 46, the audio data supplied from the audio-data conversion section 47, and the low-resolution data supplied from the low-resolution data processing section 48. Alternatively, the multiplexer 49 may independently output each data in parallel.

Figure 10:
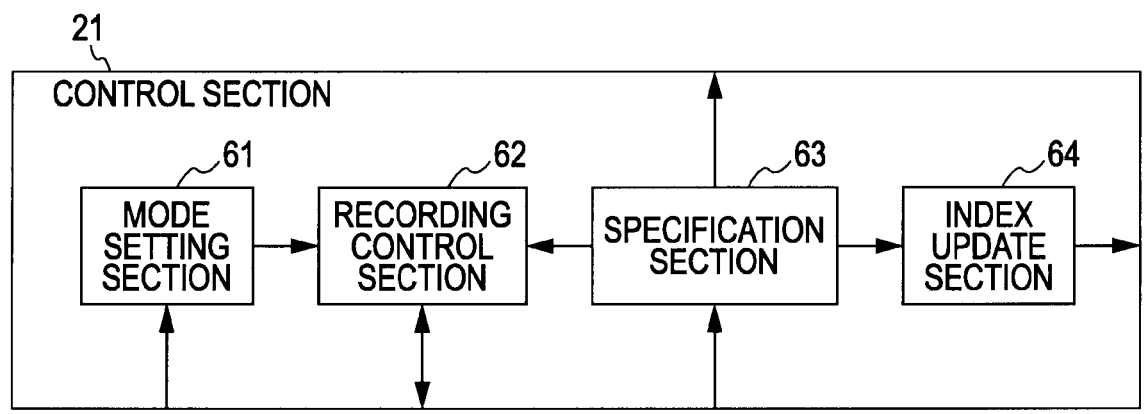
FIG. 10 is a block diagram illustrating an example of the configuration of a control section.

Next, FIG. 10 illustrates an example of the functional configuration of the control section 21 when a new clip is inserted into an edit result.

The control section 21 includes a mode setting section 61, a recording control section 62, a specification section 63, and an index update section 64.

The mode setting section 61 sets the insert mode for inserting a new clip as an insert target to a VTR-like mode or a pry-open mode on the basis of the operation signal from the operation section 22 in FIG. 8. Here, the VTR-like mode is a mode for insert editing an insert target into the insert section specified as an edit section.

Also, in the pry-open mode, when a part of or all of a plurality of clips are included in an insert section, that is to say, the insert section extends over a plurality of clips, a clip to be inserted (in the following, referred to as an insert clip) is inserted into the section from the start position of the insert section of the edit result to the end position of the beginning clip in the insert section, and then the remaining data of the insert clip is inserted into the section between the end position of the beginning clip and the beginning position of the next clip by pry-opening that section. The mode setting section 61 supplies information indicating the set insert mode to the recording control section 62.

The recording control section 62 controls the servo control section 15, the signal processing section 16, the memory controller 17, and the data conversion section 19 on the basis of the information from the mode setting section 61 and the information indicating the insert section supplied from the specification section 63, and executes recording/reproducing processing.

The specification section 63 requests an insert flip from the data input/output device 40 on the basis of the operation signal corresponding to the operation that is supplied from the operation section 22 for specifying the insert clip. Also, the specification section 63 specifies the insert section by supplying the information indicating the insert section to the recording control section 62 and the index update section 64 on the basis of the operation signal corresponding to the operation for specifying the insert section, which is supplied from the operation section 22.

The index update section 64 updates the index file stored in the index-file storage section 23 on the basis of the information indicating the insert section that is supplied from the specification section 63.

Next, a detailed description will be given of the VTR-like mode and the pry-open mode of the disc editing apparatus 10 of FIG. 8 with reference to FIGS. 11 to 15.

Figure 11:
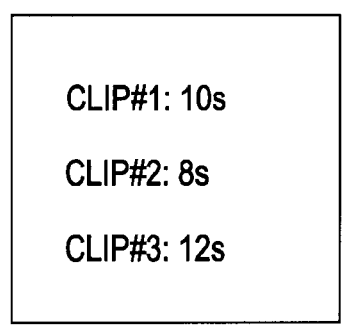
FIG. 11 is a diagram illustrating an example of an index file.

First, when the index file shown in FIG. 11 is stored in the index-file storage section 23 in FIG. 8, the control section 21 refers to the index file, and reproduces the edit result shown in FIG. 12.

That is to say, in the index list in FIG. 11, Clip#1, Clip#2, and Clip#3 are described in sequence from above, and reproducing time periods, 10 seconds, 8 seconds, and 12 seconds are described in accordance with respective clips. Accordingly, as shown in FIG. 12, the control section 21 reproduces Clip#1 recorded on the optical disc 11 and having a reproducing time of 10 seconds, Clip#2 having a reproducing time of 8 seconds, and Clip#3 having a reproducing time of 12 seconds in sequence, and outputs them as the edit result.

In this case, when the user operates the operation section 22 to specify the position 3 seconds before the end position of Clip#2 as In Point of the insert section, specifies the position 3 seconds after the beginning position of Clip#3 as Out Point, and specifies the insert clip, the edit result becomes as shown in FIG. 13 if the insert mode is the VTR-like mode.

That is to say, the recording control section 62 (FIG. 10) of the control section 21 overwrites, in response to the request of the specification section 63, the data of the section from the beginning to 3-second position out of the insert clip input from the data input/output device 40 into the recording area of the optical disc 11 on which the data corresponding to the section from the position 3 seconds before the end position of Clip#2 to the end position. Also, the recording control section 62 overwrites the data of the section from the 3-second position after the beginning to the end out of the insert clip into the recording area on which the data corresponding to the section from the beginning position of Clip#3 to the 3-second position after the beginning position.

In this manner, only the data of Clip#2 and Clip#3 are overwritten, and thus the reproducing time periods of Clip#2 and Clip#3 are not changed. Accordingly, the index update section 64 does not update the index file, and the index file shown in FIG. 11 is stored in the index-file storage section 23 without change.

As described above, when the insert mode is the VTR-like mode, the insert target is inserted into the insert section.

Figure 14:
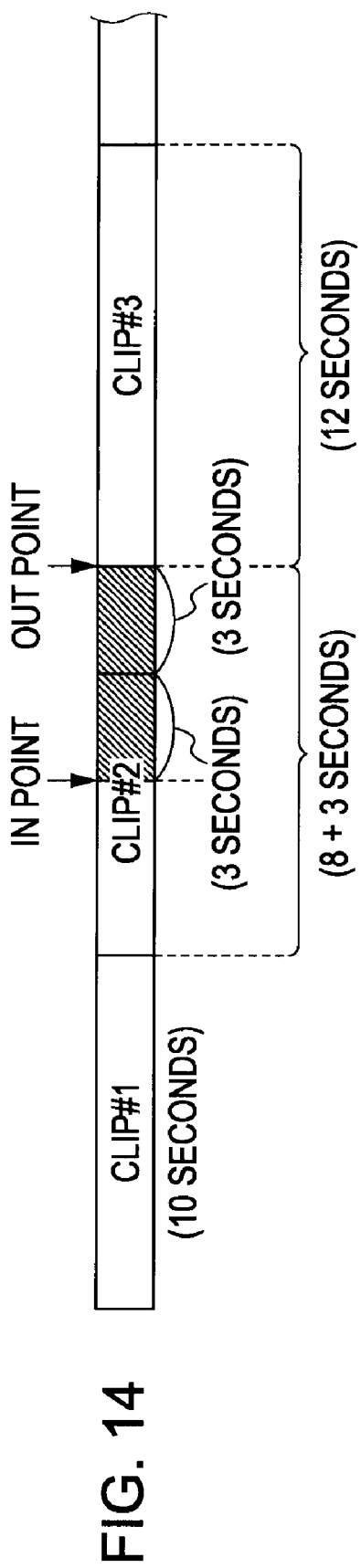
FIG. 14 is a diagram illustrating an edit result after insert processing is performed in a pry-open mode.

On the other hand, when the insert mode is the pry-open mode, the edit result becomes as shown in FIG. 14.

That is to say, the recording control section 62 overwrites, in response to the request of the specification section 63, the data of the section from the beginning to 3-second position out of the insert clip input from the data input/output device 40 into the recording area of the optical disc 11 on which the data corresponding to the section from the position 3 seconds before the end position of Clip#2, which is the beginning clip of the insert section, to the end position.

Also, the recording control section 62 adds the data of the section from the 3-second position after the beginning to the end, out of the insert clip, to the end position of Clip#2 to make it as new Clip#2, and records the additional data into the unrecorded area, in which data is not recorded, out of the recording area of the optical disc 11. In this regard, the clips following Clip#3 included in the insert section are not changed.

In this manner, in the new Clip#2, the data having a reproducing time period of 3 seconds is added, and thus the reproducing time period of the new Clip#2 is changed from 8 seconds to 11 seconds. However, the clips following Clip#3 included in the insert section are not changed, and thus the reproducing time periods of the clips other than Clip#2 are not changed. Accordingly, the index update section 64 updates the index file in FIG. 11 stored in the index-file storage section 23, resulting in the index file shown in FIG. 15.

Figure 15:
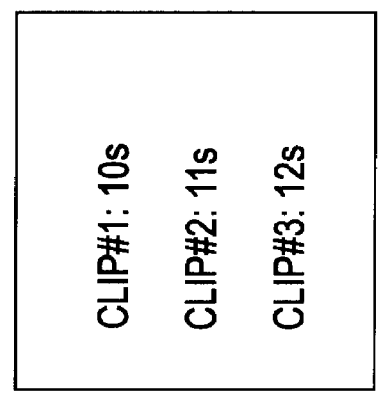
FIG. 15 is a diagram illustrating another example of an index file.

That is to say, in the index list in FIG. 15, Clip#1, Clip#2, and Clip#3 are described in sequence from above, and reproducing time periods, 10 seconds, 11 seconds, and 12 seconds are described in accordance with the respective clips.

Accordingly, as shown in FIG. 14, the disc editing apparatus 10 reproduces the clips, as the edit result, in the order of Clip#1 having a reproducing time period of 10 seconds, new Clip#2 having a reproducing time period of 11 seconds, and Clip#3 having a reproducing time period of 12 seconds by referring to the index file in FIG. 15.

As described above, when the insert mode is the pry-open mode, if a part of or all of a plurality of clips are included in an insert section, the insert clip is inserted into the section from In Point of the insert section of the edit result to the end of the beginning clip in the insert section, and then the remaining data is inserted into the section between the end position of the beginning clip and the beginning position of the next clip. That is to say, when the insert mode is the pry-open mode, the clips can be reproduced such that the beginning clip included in the insert section is overwritten by the insert clip, and the clips other than the beginning clip are protected without change as a result of the insert.

Figure 16:
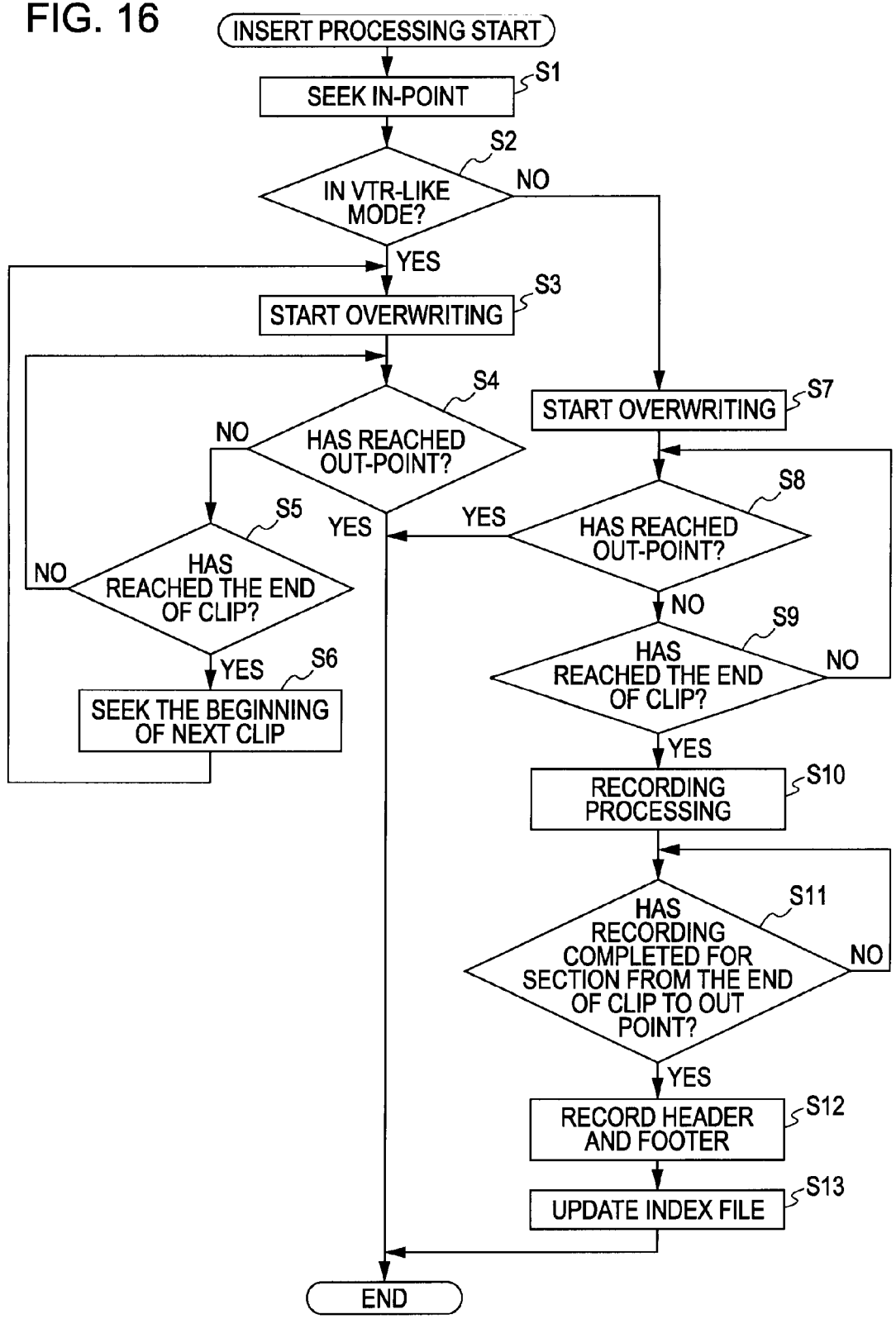
FIG. 16 is a flowchart illustrating insert processing.

Next, referring to FIG. 16, a description will be given of insert processing in which the disc editing apparatus 10 of FIG. 8 inserts an insert clip. This insert processing is started, for example when the user specifies the insert mode, In Point, and instructs to start the insert processing.

In step S1, the specification section 63 in FIG. 10 supplies the information indicating In Point to the recording control section 62 and the index update section 64 on the basis of the operation signal corresponding to the operation for specifying In Point by the user. The recording control section 62 controls the servo control section 15 on the basis of the information indicating In Point, and causes the pickup section 13 to seek the recording position of the data corresponding to In Point.

After the processing of step S1, the processing proceeds to step S2, and the mode setting section 61 determines whether the insert mode specified by the user is the VTR-like mode on the basis of the operation signal from the operation section 22. If the insert mode specified by the user is determined to be the VTR-like mode, the mode setting section 61 sets the insert mode to the VTR-like mode, and supplies the information indicating the VTR-like mode to the recording control section 62, and the processing proceeds to step S3.

In step S3, the recording control section 62 starts overwriting with the insert clip by controlling the servo control section 15, the signal processing section 16, the memory controller 17, and the data conversion section 19.

In step S4, the recording control section 62 determines whether the pickup section 13 has reached the recording position of the data corresponding to Out Point on the basis of the information indicating Out Point supplied from the specification section 63. In this regard, the user may specify Out Point before starting the insert processing, or may specify it after starting the processing. If the user specifies Out Point after starting the insert processing, when the user specifies Out Point, the processing proceeds from the processing of step S3 to the processing of step S4.

In step S4, if it is determined that the pickup section 13 has reached the recording position of the data corresponding to Out Point, the processing terminates.

On the other hand, in step S4, if it is determined that the pickup section 13 has not reached the recording position of the data corresponding to Out Point, the processing proceeds to step S5. The recording control section 62 determines whether the pickup section 13 has reached the recording position of the end of the clip being overwritten now. If determined that the pickup section 13 has not reached, the processing proceeds to step S4.

Also, in step S5, if it is determined that the pickup section 13 has reached the recording position of the end of the clip, the processing proceeds to step S6. The recording control section 62 refers to the index file, controls the servo control section 15, and causes the pickup section 13 to seek the beginning recording position of the clip whose reproducing sequence is next to that of the clip being overwritten now.

For example, in the case of the example in FIG. 13, when the pickup section 13 has reached the recording position of the end of Clip#2, the recording control section 62 causes the pickup section 13 to seek the beginning recording position of Clip#3 whose reproducing sequence is next to that of Clip#2.

After the processing of step S6, the processing returns to step S3. As described above, the recording control section 62 starts the overwriting of the data not yet being overwritten out of the insert clip by controlling the servo control section 15, the signal processing section 16, the memory controller 17, and the data conversion section 19, and repeats the subsequent processing.

On the other hand, in step S2, if it is determined that the insert mode specified by the user is not the VTR-like mode, that is to say, that the user has specified the pry-open mode, the mode setting section 61 sets the insert mode to the pry-open mode, and supplies the information indicating the pry-open mode to the recording control section 62, and the processing proceeds to step S7.

In step S7, in the same manner as the processing of step S3, the recording control section 62 starts the overwriting of the insert clip, and the processing proceeds to step S8.

In step S8, in the same manner as the processing of step S4, the recording control section 62 determines whether the pickup section 13 has reached the recording position of the data corresponding to Out Point on the basis of the information indicating Out Point supplied from the specification section 63. If determined that the pickup section 13 has reached, the processing terminates.

Also, in step S8, if it is determined that the pickup section 13 has not reached the recording position of the data corresponding to Out Point, the processing proceeds to step S9. In the same manner as the processing of step S5, the recording control section 62 determines whether the pickup section 13 has reached the recording position of the end of the clip being overwritten now. If determined that the pickup section 13 has not reached, the processing proceeds to step S8.

On the other hand, in step S9, if it is determined that the pickup section 13 has reached the recording position of the end of the clip being overwritten now, the processing proceeds to step S10, and the recording control section 62 performs the recording processing for recording the data not yet being overwritten out of the insert clip into the unrecorded area of the optical disc 11.

After the processing of step S10, the processing proceeds to step S11, and the recording control section 62 determines whether the data not being overwritten out of the insert clip is recorded in the section from the end of the overwritten clip to Out Point.

For example, in the case of the example in FIG. 14, a determination is made on whether the data of the section, for 3 seconds, from the end of Clip#2 to Out Point, namely the data being not overwritten out of the insert clip, which is the data of 3 seconds after the beginning of the insert clip has been recorded, that is to say, the data after 3 seconds from the beginning of the insert clip to the subsequent 6 seconds has been recorded.

In step S11, if it is determined that the data of the section from the end of the overwritten clip to Out Point has not been recorded, the processing is waited until the recording has been completed.

In step S11, if it is determined that the data of the section from the end of the overwritten clip to Out Point has been recorded, the processing proceeds to step S12. The recording control section 62 terminates the compression and the recording, which have been started in step S26 and step S27 in FIG. 18 described below, records the header and footer, and the processing proceeds to step S13.

In step S13, the index update section 64 updates the index file by changing the description of the reproducing time in the index file on the basis of the information of In Point and Out Point supplied from the specification section 63. For example, in the case of the example in FIG. 14, the recording control section 62 changes the description of the reproducing time period of Clip#2 of the index file in FIG. 11 from 8 seconds to 11 seconds, and thus performs update to produce the index file in FIG. 15.

As described above, when the insert mode is the pry-open mode, the disc editing apparatus 10 does not overwrite the clips other than the beginning clip included in the insert section. Thus, it is possible to protect the clips other than the beginning clip, and to extend the beginning clip by the length of the insert target. As a result, when the user inserts the insert target by specifying In Point, it is possible for the user to protect the clips, which are unexpected by the user, subsequent to the clip corresponding to In Point from being overwritten.

Also, the disc editing apparatus 10 overwrites the beginning clip, and thus it is possible to restrain consumption of unrecorded area of the optical disc 11.

Figure 17:
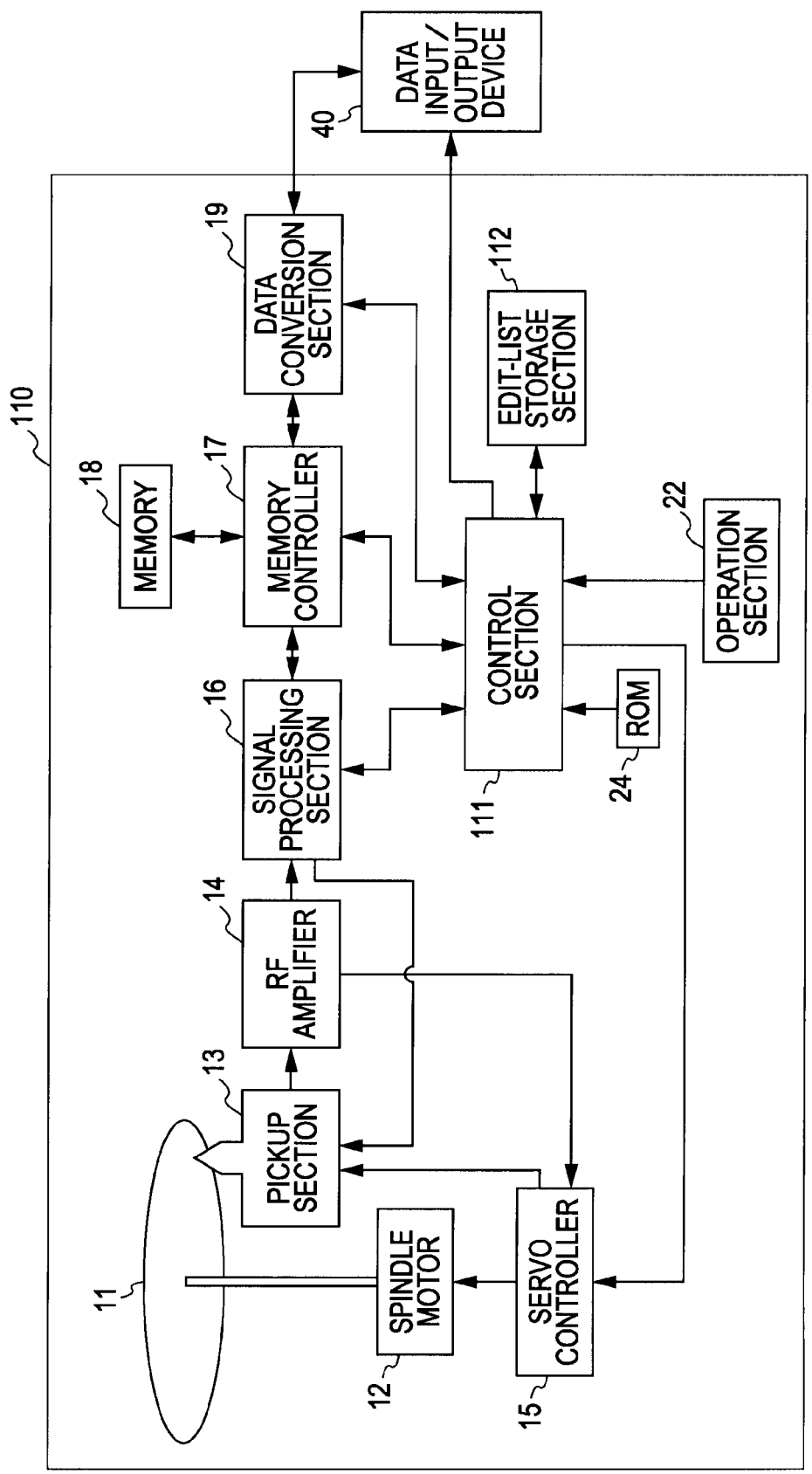
FIG. 17 is a block diagram illustrating an example of the configuration of a disc editing apparatus according to another embodiment of the present invention.

FIG. 17 illustrates an example of the configuration of a disc editing apparatus according to another embodiment of the present invention. In this regard, the disc editing apparatus 110 in FIG. 17 performs nonlinear editing.

In FIG. 17, the sections marked with the same reference numerals as those in FIG. 8 are the same, and thus the description thereof are omitted.

The control section 111 controls the servo controller 15, the signal processing section 16, the memory controller 17, and the data conversion section 19 on the basis of the operation signal from the operation section 22, the edit list indicating the reproducing sequence of the data forming the edit result read from an edit-list storage section 112, etc., in accordance with the program stored in a ROM 24, and executes the recording/reproducing processing. Also, the control section 111 generates an edit file on the basis of the operation signal from the operation section 22 in accordance with the program stored in the ROM 24, and supplies and stores the file into the edit-list storage section 112.

Figure 18:
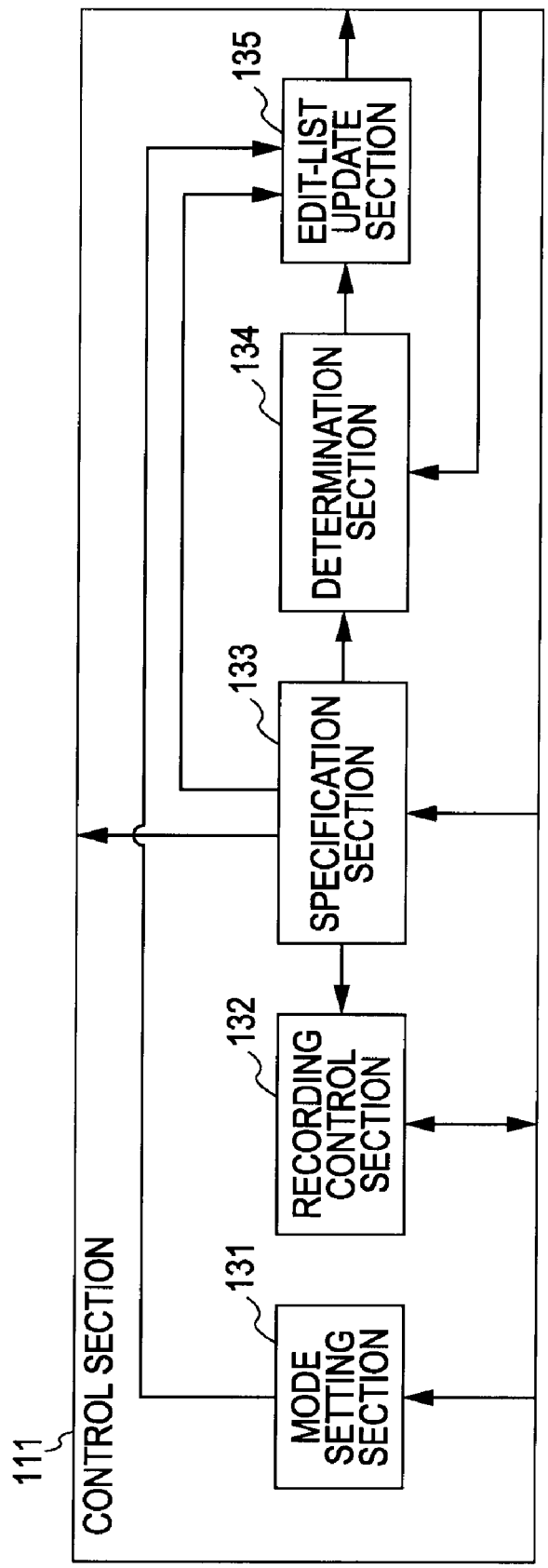
FIG. 18 is a block diagram illustrating an example of the configuration of the control section in FIG. 17.

Next, FIG. 18 illustrates an example of the functional configuration of the control section 111 when an insert clip is inserted into an edit result.

The control section 111 includes a mode setting section 131, a recording control section 132, a specification section 133, a determination section 134, and an edit-list update section 135.

In the same manner as the mode setting section 61 in FIG. 10, the mode setting section 131 sets the insert mode for inserting an insert clip to a VTR-like mode or a pry-open mode on the basis of the operation signal from the operation section 22 in FIG. 17. The mode setting section 131 supplies the information indicating the set insert mode to the edit-list update section 135.

The recording control section 132 controls the servo control section 15, the signal processing section 16, the memory controller 17, and the data conversion section 19 on the basis of the information indicating the insert section supplied from the specification section 133, and executes recording/reproducing processing.

In the same manner as the specification section 63 in FIG. 10, the specification section 133 requests an insert flip from the data input/output device 40 on the basis of the operation signal corresponding to the operation, supplied from the operation section 22 for specifying an insert clip. Also, the specification section 133 supplies the information indicating the insert section to the recording control section 132, the determination section 134, and the edit-list update section 135 on the basis of the operation signal corresponding to the operation for specifying the insert section, which is supplied from the operation section 22.

The determination section 134 determines whether a part of or all of a plurality of clips are included in an insert section as an edit clip on the basis of the information indicating the insert section supplied from the specification section 133 and the edit list read from the edit-list storage section 112, and supplies the determination result to the edit-list update section 135.

The edit-list update section 135 updates the edit list stored in the edit-list storage section 112 on the basis of the information indicating the mode supplied from the mode setting section 131, the determination result supplied from the determination section 134, and the information indicating the insert section supplied from the specification section 133.

Next, a detailed description will be given of the VTR-like mode and the pry-open mode of the disc editing apparatus 110 of FIG. 17 with reference to FIGS. 19 to 24.

Figures 19, 20:
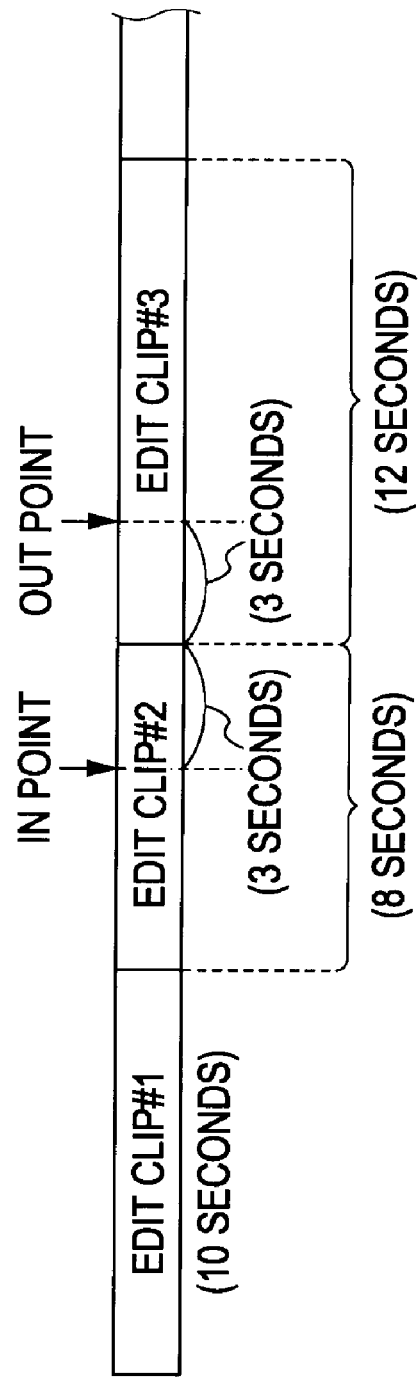
FIG. 19 is a diagram illustrating an example of an edit list.
FIG. 20 is a diagram illustrating another example of the structure of an edit result before insert processing.

First, when the edit list shown in FIG. 19 is stored in the edit-list storage section 112 in FIG. 17, the control section 111 refers to the edit list, and reproduces the edit result shown in FIG. 20.

Figure 1:
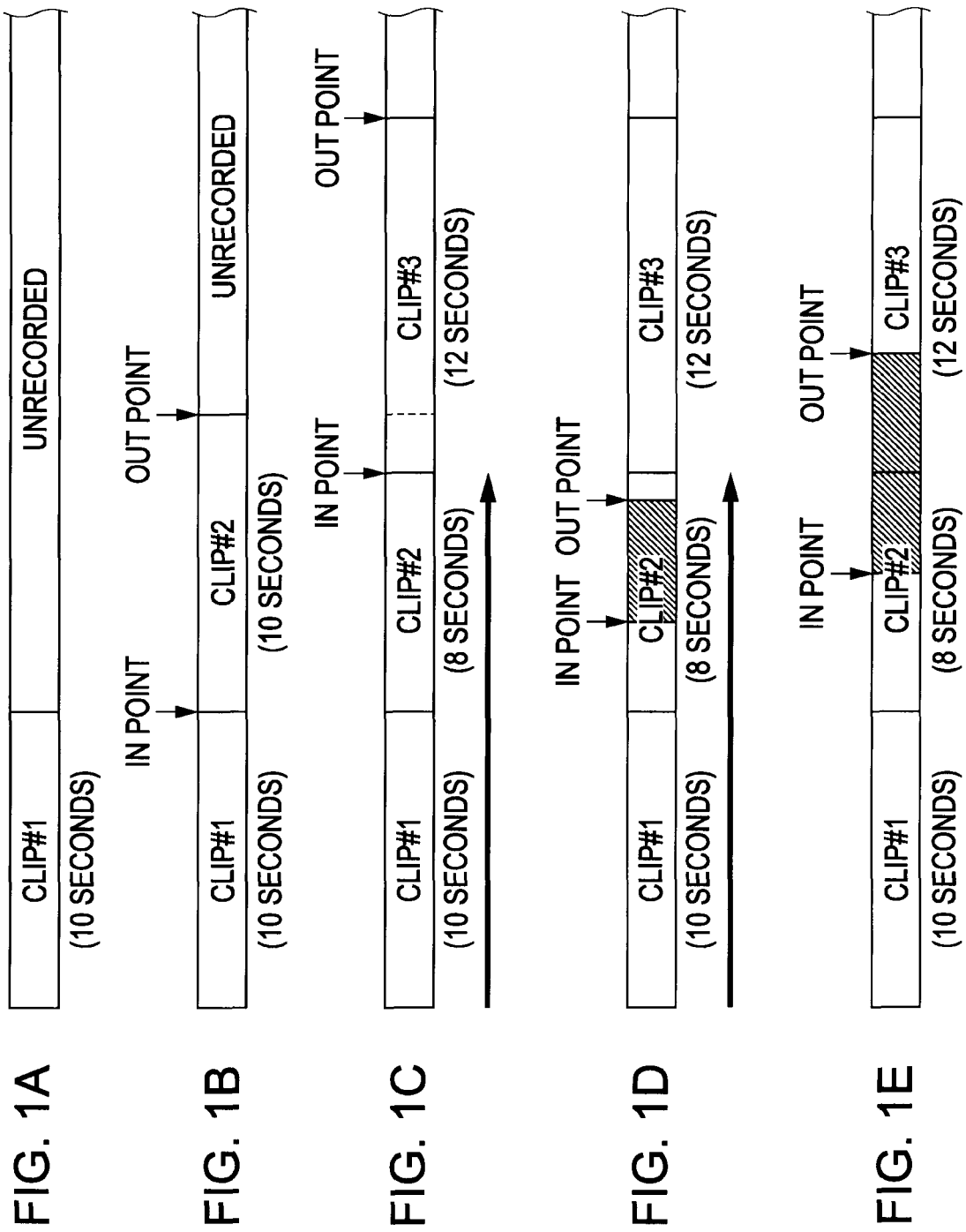
FIGS. 1A to 1E are diagrams illustrating examples of linear editing.
Figures 2, 3:
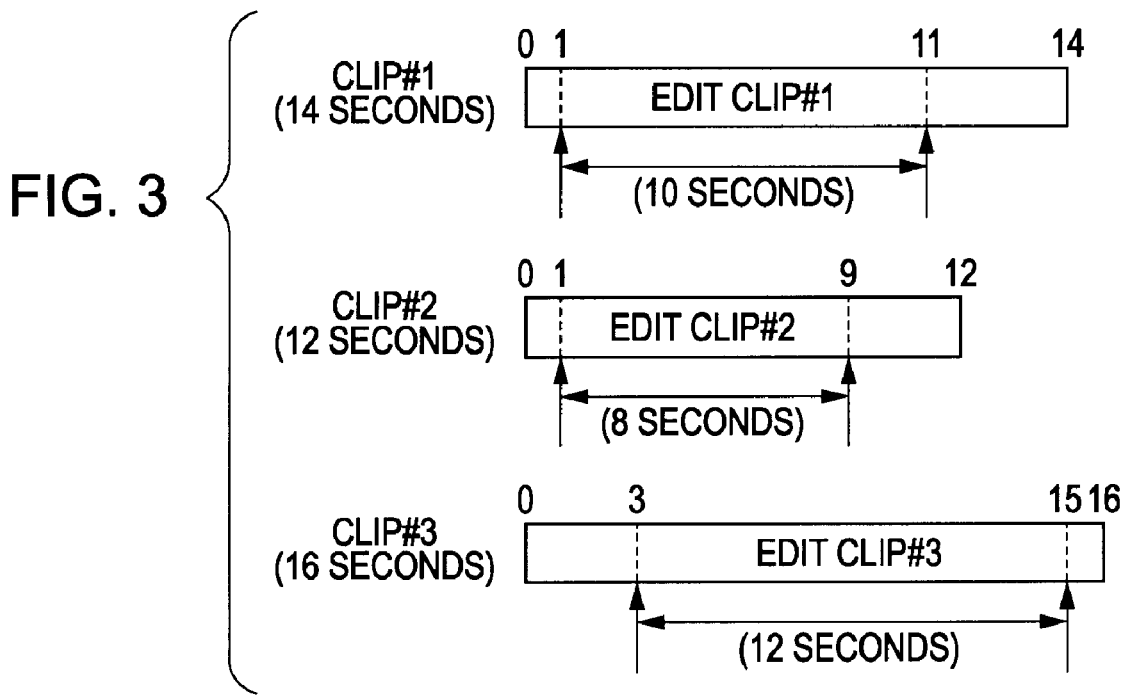
FIG. 2 is a diagram illustrating an example of an edit list.
FIG. 3 is a diagram illustrating examples of edit clips.
Figure 4A:
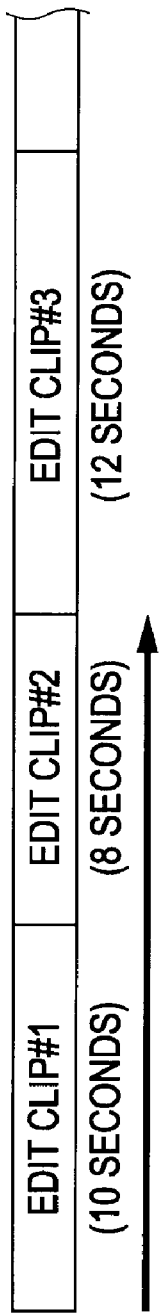
FIG. 4 is a diagram illustrating an example of an edit result of nonlinear editing.
Figure 4B:
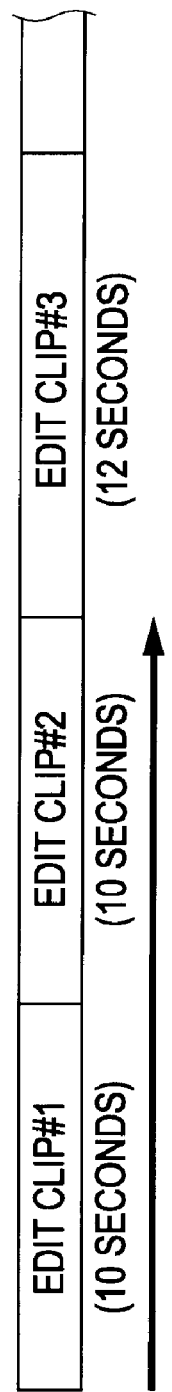
Figure 5:
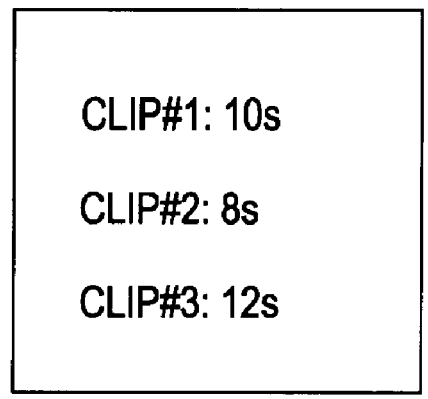
FIG. 5 is a diagram illustrating an example of an index file.
Figure 6:
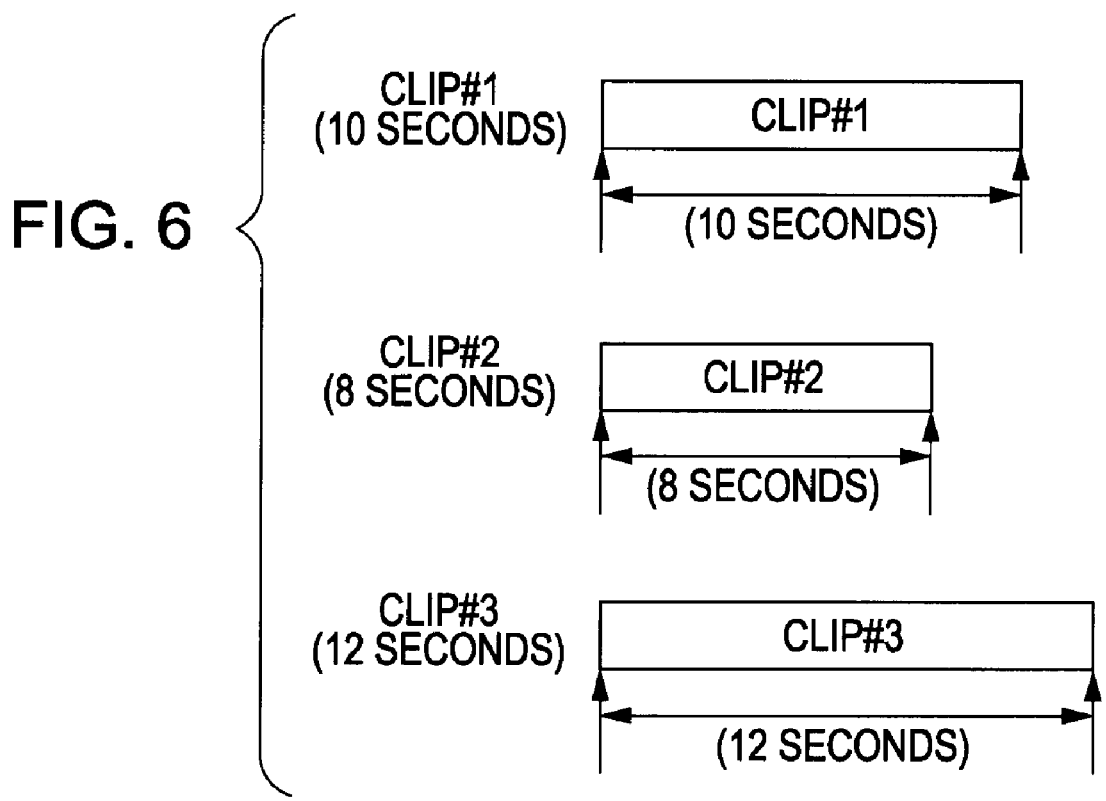
FIG. 6 is a diagram illustrating an example of clips forming an edit result.

That is to say, in the edit list in FIG. 19, which is the same as that in FIG. 2, Clip#1, Clip#2, and Clip#3 are described in reproducing order from above, and the clip time codes indicating the start position and the end position of each clip included in the edit result are described in accordance with the respective clips.

Accordingly, as shown in FIG. 20, the control section 111 reproduces Edit Clip#1, which is the data of the section of Clip #1 having a time code of from 1 second to 11 seconds, recorded on the optical disc 11, Edit Clip#2, which is the data of the section of Clip #2 having a time code of from 1 second to 9 seconds, and Edit Clip#3, which is the data of the section of Clip #3 having a time code of from 3 seconds to 15 seconds in sequence, and outputs them as an edit result.

Figure 21:
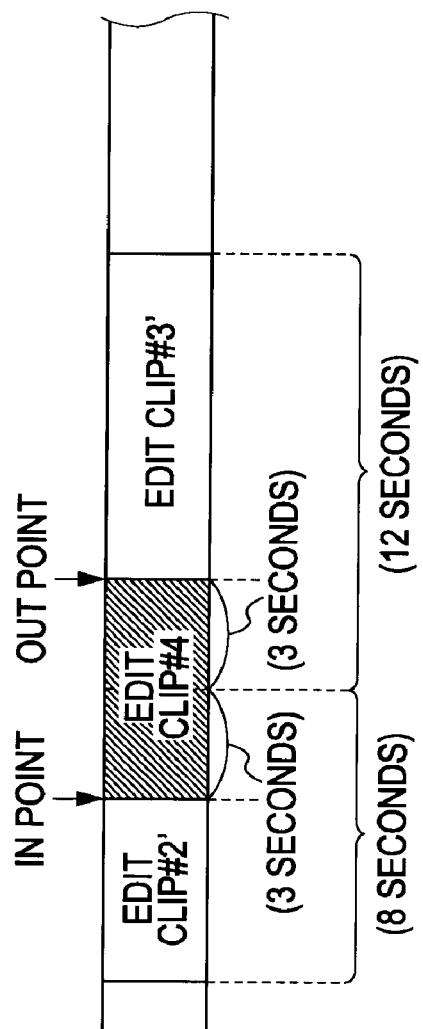
FIG. 21 is a diagram illustrating another edit result after insert processing is performed in a VTR-like mode.

In this case, when the user operates the operation section 22 to specify the position 3 seconds before the end position of Edit Clip#2 as In Point of the insert section, specifies the position 3 seconds after the beginning position of Edit Clip#3 as Out Point, and specifies Edit Clip#4, which is the insert clip, the edit result becomes as shown in FIG. 21 if the insert mode is the VTR-like mode.

That is to say, the recording control section 132 (FIG. 18) of the control section 111 records, in response to the request of the specification section 133, the data of the section from the beginning to 6-second position, for the insert section, out of Clip#4, which is the insert clip, input from the data input/output device 40, into the unrecorded recording area of the optical disc 11. The edit-list update section 135 updates the edit list of FIG. 19 stored in the edit-list storage section 112 to produce the edit list shown in FIG. 22.

Figure 22:
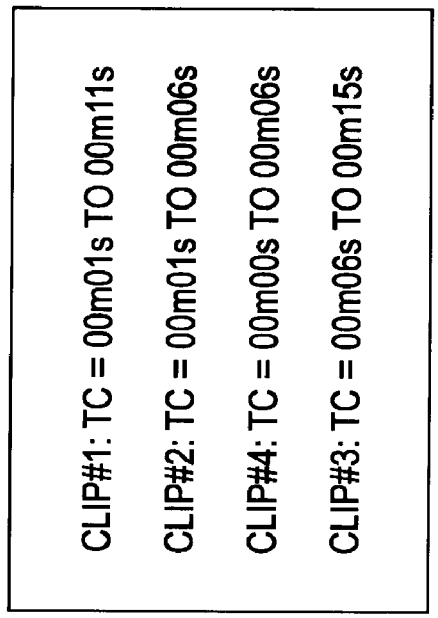
FIG. 22 is a diagram illustrating another example of an edit list.

In the edit list in FIG. 22, the end position corresponding to Clip#2 in the edit list of FIG. 19 is changed from 9 seconds to 6 seconds, Clip#4 is added between Clip#2 and Clip#3, and furthermore the start position corresponding to Clip#3 is changed from 3 seconds to 6 seconds. Also, the start position of 0 second and the end position of 6 seconds are described in relation to Clip#4.

Accordingly, with reference to the edit list in FIG. 22, as shown in FIG. 21, the disc editing apparatus 110 reproduces Edit Clip#1, Edit Clip#2, which is the data of the section of Clip#2 from 1 second to 6 seconds, Edit Clip#4, which is the data of the section of Clip#4 from 0 second to 6 seconds, and Edit Clip#3, which is the data of the section of Clip#3 from 6 seconds to 15 seconds in sequence as the edit result.

As described above, when the insert mode is the VTR-like mode, the insert target is inserted into the insert section.

Figures 23, 24:
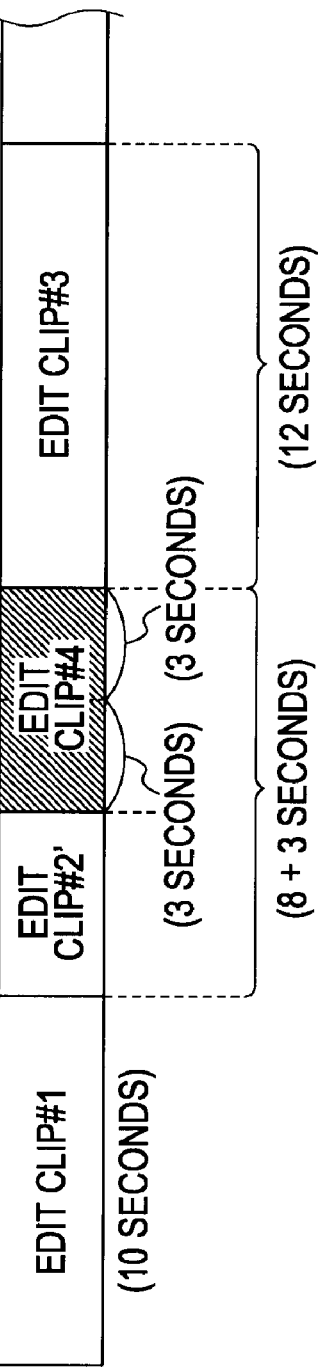
FIG. 23 is a diagram illustrating another edit result after insert processing is performed in a pry-open mode.
FIG. 24 is a diagram illustrating still another example of an edit list.

On the other hand, when the insert mode is the pry-open mode, the edit result becomes as shown in FIG. 23.

That is to say, in the same manner as at the time of the VTR-like mode, the recording control section 132 records Clip#4 into the unrecorded area of the optical disc 11. The edit-list update section 135 updates the edit list of FIG. 19 stored in the edit-list storage section 112 to produce the edit list shown in FIG. 24.

In the edit list in FIG. 24, the end position corresponding to Clip#2 in the edit list of FIG. 19 is changed from 9 seconds to 6 seconds, Clip#4 is added between Clip#2 and Clip#3. Also, the start position of 0 second and the end position of 6 seconds are described in relation to Clip#4.

Accordingly, with reference to the edit list in FIG. 24, as shown in FIG. 23, the disc editing apparatus 110 reproduces Edit Clip#1, Edit Clip#2, which is the data of the section of Clip#2 from 1 second to 6 seconds, Edit Clip#4, and Edit Clip#3 in sequence as the edit result.

As described above, when the insert mode is the pry-open mode, if a part of or all of a plurality of clips are included in an insert section, the insert clip is inserted, from the beginning, into the section from In Point of the insert section of the edit result to the end of the beginning clip in the insert section, and then the remaining data is inserted into the section between the end of the beginning edit clip and the beginning of the next edit clip.

Figure 25:
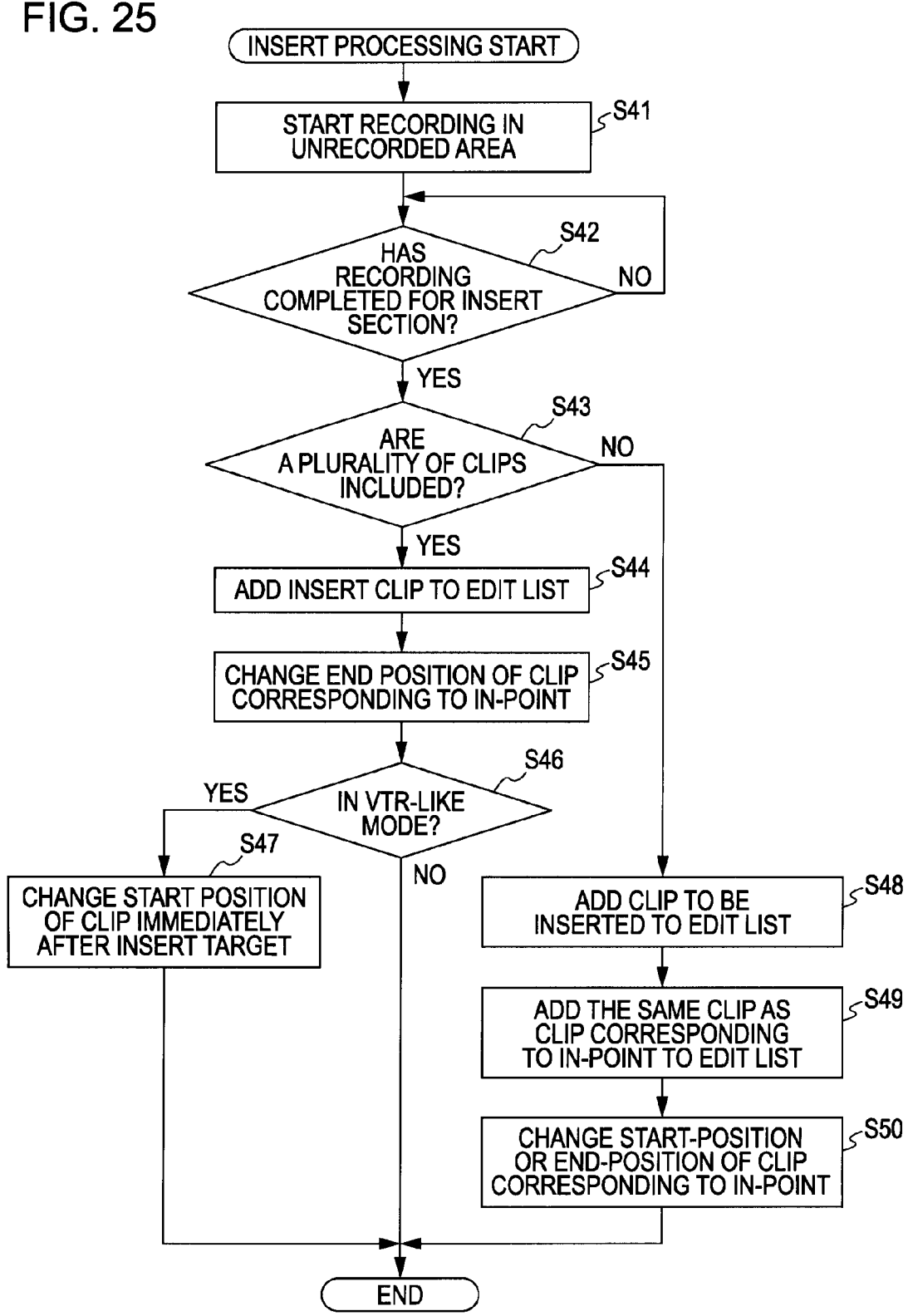
FIG. 25 is a flowchart illustrating another insert processing.

Next, referring to FIG. 25, a description will be given of insert processing in which the disc editing apparatus 110 in FIG. 17 inserts an insert clip. This insert processing is started, for example when the user specifies the insert mode, In Point, and instructs to start the insert processing.

In step S41, the recording control section 132 in FIG. 18 starts the recording of the insert clip into an unrecorded area of the optical disc 11 by controlling the servo control section 15, the signal processing section 16, the memory controller 17, and the data conversion section 19.

After the processing of step S41, the processing proceeds to step S42. The recording control section 132 determines whether the insert clip has been recorded for the insert section on the basis of the information indicating the insert section supplied from the specification section 133.

For example, as described using FIGS. 19 to 24, when the user specifies the position 3 seconds before the end of Edit Clip#2 as In Point of the insert section, and specifies the position 3 seconds after the beginning of Edit Clip#3 as Out Point, that is to say, when the insert section is 6 seconds, the recording control section 132 determines whether the data of the section from the beginning of Clip#4, which is the insert clip, to 6 seconds has been recorded.

In step S42, if it is determined that the insert clip has not been recorded for the insert section, the recording control section 132 waits until the recording for the insert section has been completed.

On the other hand, in step S42, if it is determined that the insert clip has been recorded for the insert section, the recording control section 132 terminates recording, and the processing proceeds to step S43.

In step S43, the determination section 134 determines whether a part of or all of a plurality of clips are included in the insert section as an edit clip on the basis of the information indicating the insert section supplied from the specification section 133 and the edit list stored in the edit-list storage section 112, and supplies the determination result to the edit-list update section 135.

In step S43, if it is determined that a part of or all of a plurality of clips are included in the insert section as an edit clip, the processing proceeds to step S44. The edit-list update section 135 adds the information indicating the insert clip to the position immediately after the information indicating the clip corresponding to In Point of the insert section in the edit list stored in the edit-list storage section 112 on the basis of the information indicating the insert section supplied from the specification section 133 and the determination result from the determination section 134. Also, the edit-list storage section 112 describes the start position and the end position corresponding to the recorded data for the insert section out of the insert clip in relation to the information indicating the insert clip on the basis of the information indicating the insert section.

After the processing of step S44, the processing proceeds to step S45. The edit-list update section 135 changes the end position related to the clip corresponding to In Point of the edit list on the basis of the information indicating the insert section, and the processing proceeds to step S46.

In step S46, the edit-list update section 135 determines whether the insert mode is the VTR-like mode on the basis of the information indicating the insert mode supplied from the mode setting section 131. If the insert mode is not determined to be the VTR-like mode, that is to say, the insert mode is the pry-open mode, the processing terminates.

For example, in the case of the example in FIG. 23, the information "Clip#4" indicating Clip#4, which is the insert clip, is added to the position immediately after the information "Clip#2" indicating Clip#2 corresponding to In Point in the edit list of FIG. 19. The beginning position "0 second" of the insert clip, which is the start position of the data for the insert section and the end position "6 seconds" are described in accordance with the information. The end position of Clip#2 corresponding to In Point is changed to the clip time code "6 seconds" corresponding to In Point, and the edit list of FIG. 24 is stored into the edit-list update section 135 as a result.

On the other hand, in step S46, if the insert mode is determined to be the VTR-like mode, the processing proceeds to step S47. The edit-list update section 135 changes the start position corresponding to the information indicating the clip immediately after the information indicating the insert clip added into the edit list in step S44 on the basis of the information indicating the insert section. For example, in the example of FIG. 22, in the edit list of FIG. 24, furthermore, the start position corresponding to the information "Clip#3" indicating Clip#3 immediately after the information "Clip#4" indicating Clip#4, which is the insert clip, is changed to the clip time code "6 seconds" corresponding to Out Point. As a result, the edit list of FIG. 22 is stored in the edit-list update section 135.

Also, in step S43, if it is determined that a part of or all of a plurality of clips are not included in the insert section as an edit clip, the processing proceeds to step S48. In the same manner as step S44, the edit-list update section 135 adds the information indicating the insert clip to the position immediately after the information indicating the clip corresponding to In Point of the insert section in the edit list stored in the edit-list storage section 112 on the basis of the information indicating the insert section supplied from the specification section 133 and the determination result from the determination section 134. Also, the edit-list storage section 112 describes the start position and the end position corresponding to the recorded data for the insert section out of the insert clip in relation to the information indicating the insert clip on the basis of the information indicating the insert section.

After the processing of step S48, the processing proceeds to step S49. The edit-list update section 135 describes the information indicating the same clip as the clip corresponding to In Point at the position immediately after the information indicating the insert clip added in step S48. As a result, in the edit list, information indicating the clip corresponding to In Point is described again immediately after the information indicating the insert clip described immediately after the information indicating the clip corresponding to In Point.

For example, in the example of FIG. 20, In Point and Out Point fall in the section between the start position and the end position of Edit Clip#2, the information "Clip#4" indicating Clip#4, which is the insert clip, is described immediately after the information "Clip#2" indicating Clip#2 corresponding to Edit Clip#2, and "Clip#2" is described once again immediately after that.

After the processing of step S49, the processing proceeds to step S50. The edit-list update section 135 changes the start position or the end position of the clip described in relation to the information indicating the clip corresponding to In Point described on the basis of the information indicating the insert section. Specifically, the edit-list update section 135 changes the end position corresponding to the information of the clip corresponding to In Point described before the addition in step S49 to the clip time code corresponding to In Point. Also, the edit-list update section 135 changes the start position corresponding to the information of the clip corresponding to In Point added in step S49 to the clip time code corresponding to Out Point. After the processing of step S50, the processing terminates.

In this regard, the present invention can be applied to a disc-shaped recording medium other than an optical disc.

As described above, when a part of or all of a plurality of the files are included in an insert section, the disc editing apparatus 10 or 110 records the data corresponding to the section other than the section from In Point of the insert section out of the insert clip to the end of the clip including the data of the In Point into the unrecorded area, which is an area on which a file has not been recorded out of the recording area of the optical disc 11. Also, the disc editing apparatus 10 or 110 records the data other than the data recorded in the unrecorded area, out of the insert clip, into a predetermined area of the optical disc 11, and generates the index file such that the section from the beginning of the clip including the data of In Point to the In Point, and the insert clip are reproduced in sequence, and then the clip next to the clip including the data of In Point as a reproducing sequence before the insert is reproduced from the beginning. Thus, it is possible to reproduce the edit result such that the beginning clip included in the insert section is overwritten by the new clip, and the files other than the beginning clip are protected without change.

In this regard, in this specification, the steps describing the programs stored in the program recording medium include the processing to be performed in time series in accordance with the described sequence as a matter of course. Also, the steps include the processing which is not necessarily executed in time series, but is executed in parallel or individually.

Also, an embodiment of the present invention is not limited to the embodiments described above, and various modifications are possible without departing from the spirit and scope of the present invention.

What is claimed is:

1. A recording control apparatus for recording new data on a recording medium on which a part of or all of a plurality of files previously recorded are combined to form an edit result, the recording control apparatus comprising:
   a specification section that specifies an insert section into which the new data is inserted into the edit result;
   a recording control section that records, in response to the insert section being included in the edit result within a part of or all of the previously recorded plurality of files, first additional data out of the new data into an unrecorded area in which the plurality of files are not recorded, the unrecorded area corresponding to a section of the edit result other than a section from a start position of the insert section to the end of an insertion file in which the insert section is located, and
   second additional data, out of the new data, by overwriting a recorded area of the recording medium containing the insertion file;
   a generation section that generates, via a processor, sequence information indicating a reproducing sequence of the files forming the edit result; and
   a setting section that sets an insert mode in which the new data is inserted into the edit result to an additional-insert mode in which the first additional data is recorded into the unrecorded area,
   wherein
   in response to the insert mode being set to the additional-insert mode and the insert section being including in the edit result within a part of or all of a plurality of the files, the recording control section records the first additional data into the unrecorded area and records the second additional data by overwriting the recorded area of the recording medium containing the insertion file, and
   in response to the insert mode being set to the additional-insert mode and the insert section being including in the edit result within a part of or all of a plurality of the files, the generation section generates the sequence information such that data of a section from the beginning of the insertion file to the start position of the insert section and the new data are reproduced in sequence and then a next file having the reproducing sequence next to the insertion file before insertion is reproduced from the beginning.

2. The recording control apparatus according to claim 1, wherein the recording control section records the second additional into a recording area having a recording section from the start position of the insert section to the end of the insertion file.

3. The recording control apparatus according to claim 2, wherein the recording control section records the new data as a part of or all of the insertion file.

4. The recording control apparatus according to claim 1, wherein
   in response to the insert mode not being set to the additional-insert mode, the recording control section overwrites the new data into a recording area of the insertion file in which the insert section is specified,
   in response to the insert mode not being set to the additional-insert mode, the generation section generates the sequence information such that data of the section from the beginning of the insertion file to the start position of the insert section and the new data is reproduced in sequence and then the next file is reproduced from data corresponding to the end position of the insert section.

5. The recording control apparatus according to claim 1, wherein the unrecorded area corresponds to a section of the edit result from immediately after an end of the second additional data to an end of the insertion file.

6. The recording control apparatus according to claim 1, wherein an end position of the insert section is located in a second insertion file.

7. The recording control apparatus according to claim 4, wherein an end position of the insert section is located in a second insertion file.

8. The recording control apparatus according to claim 7, wherein when an end position of the insert section is located in a second insertion file and the insert mode is not the additional-insert mode, the recording control section overwrites a part of the new data into a recording area of the insertion file from the start position to an end position of the insertion file and overwrites a remaining part of the new data into the second insertion file from a start position of the second insertion file to an end position of the insert section.

9. A method of controlling recording of a recording control apparatus for recording new data on a recording medium on which a part of or all of a plurality of files previously recorded are combined to form an edit result, the method comprising the steps of:
   specifying an insert section into which the new data is inserted into the edit result;
   recording, in response to the insert section being included in the edit result within a part of or all of the previously recorded plurality of files,
   first additional data, out of the new data into an unrecorded area in which the plurality of files are not recorded, the unrecorded area corresponding to a section of the edit result other than a section from a start position of the insert section to the end of a insertion file in which the insertion section is located, and
   second additional data, out of the new data, by overwriting a recorded area of the recording medium containing the insertion file;
   generating, via a processor, sequence information indicating a reproducing sequence of the files forming the edit result;
   setting an insert mode in which the new data is inserted into the edit result to an additional-insert mode in which the first additional data is recorded into the unrecorded area;
   recording, in response to the insert mode being set to the additional-insert mode and the insert section being including in the edit result within a part of or all of a plurality of the files, the first additional data into the unrecorded area and records the second additional data by overwriting the recorded area of the recording medium containing the insertion file; and
   generating, in response to the insert mode being set to the additional-insert mode and the insert section being including in the edit result within a part of or all of a plurality of the files, the sequence information such that data of a section from the beginning of the insertion file to the start position of the insert section and the new data are reproduced in sequence and then a next file having the reproducing sequence next to the insertion file before insertion is reproduced from the beginning.

10. A non-transitory computer-readable medium storing computer readable instructions thereon for recording new data on a recording medium on which a part of or all of a plurality of files previously recorded are combined to form an edit result, the computer readable instructions which when executed by a reading control apparatus cause the reading control apparatus to perform a method comprising:

specifying an insert section into which the new data is inserted into the edit result;

recording, in response to the insert section being included in the edit result within a part of or all of the previously recorded plurality of files,
  first additional data out of the new data, into an unrecorded area in which the plurality of files are not recorded, the unrecorded area corresponding to a section of the edit result other than a section from a start position of the insert section to the end of a insertion file in which the insertion section is located, and
  second additional data, out of the new data, overwriting a recorded area of the recording medium containing the insertion file;

generating, via a processor, sequence information indicating a reproducing sequence of the files forming the edit result;

setting an insert mode in which the new data is inserted into the edit result to an additional-insert mode in which the first additional data is recorded into the unrecorded area, recording, in response to the insert mode being set to the additional-insert mode and the insert section being including in the edit result within a part of or all of a plurality of the files, the first additional data into the unrecorded area and records the second additional data by overwriting the recorded area of the recording medium containing the insertion file; and generating, in response to the insert mode being set to the additional-insert mode and the insert section being including in the edit result within a part of or all of a plurality of the files, the sequence information such that data of a section from the beginning of the insertion file to the start position of the insert section and the new data are reproduced in sequence and then a next file having the reproducing sequence next to the insertion file before insertion is reproduced from the beginning.

\* \* \* \* \*